US011465638B2

(12) United States Patent
Gaither

(10) Patent No.: US 11,465,638 B2
(45) Date of Patent: Oct. 11, 2022

(54) SYSTEM AND METHOD FOR MODULATING A PERFORMANCE OF A VEHICLE WITH MODIFIED VEHICLE COMPONENTS

(71) Applicant: TOYOTA MOTOR ENGINEERING & MANUFACTURING NORTH AMERICA, INC., Plano, TX (US)

(72) Inventor: Geoffrey D. Gaither, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 86 days.

(21) Appl. No.: 17/080,181

(22) Filed: Oct. 26, 2020

(65) Prior Publication Data

US 2022/0126848 A1 Apr. 28, 2022

(51) Int. Cl.
*B60W 50/06* (2006.01)
*B60W 50/14* (2020.01)
*G07C 5/08* (2006.01)

(52) U.S. Cl.
CPC ............ *B60W 50/06* (2013.01); *B60W 50/14* (2013.01); *G07C 5/0808* (2013.01); *B60W 2050/146* (2013.01); *B60W 2530/00* (2013.01); *B60W 2556/00* (2020.02); *B60W 2710/10* (2013.01)

(58) Field of Classification Search
CPC .. B60W 50/06; B60W 50/14; B60W 2556/00; B60W 2050/146; B60W 2530/00; B60W 2710/10; G07C 5/0808
See application file for complete search history.

(56) References Cited

U.S. PATENT DOCUMENTS

| | | | |
|---|---|---|---|
| 6,898,489 B1 | 5/2005 | Hayes, Sr. | |
| 7,042,346 B2 | 5/2006 | Paulsen | |
| 7,315,248 B2 | 1/2008 | Egbert | |
| 7,400,268 B2 | 7/2008 | Wilbrink et al. | |
| 7,415,332 B2 | 8/2008 | Ito et al. | |
| 7,420,467 B2 | 9/2008 | Patenaude et al. | |
| 8,209,076 B2 | 6/2012 | Boss et al. | |
| 8,214,105 B2 | 7/2012 | Daly et al. | |
| 8,775,010 B2 | 7/2014 | Sohmshetty et al. | |
| 9,334,820 B2 | 5/2016 | Komine et al. | |
| 9,481,375 B2 | 11/2016 | Lurie et al. | |
| 9,928,544 B1 | 3/2018 | Hasan | |
| 10,061,574 B2 | 8/2018 | Mueller et al. | |
| 2019/0213462 A1 | 7/2019 | Mcdonald et al. | |
| 2019/0308626 A1* | 10/2019 | Otanez | B60W 30/188 |
| 2020/0398859 A1* | 12/2020 | Borhan | F01N 3/2066 |

FOREIGN PATENT DOCUMENTS

JP 2008-286251 A 11/2008
KR 10-1116878 B1 3/2012

* cited by examiner

*Primary Examiner* — Edwin A Young
(74) *Attorney, Agent, or Firm* — Oblon, McClelland, Maier & Neustadt, L.L.P.

(57) ABSTRACT

A method of calibrating a driving force of a vehicle is provided. A status change of one or more components of the vehicle may be detected by a sensor. One or more models of the one or more components of the vehicle having the status change may be determined by the processing circuitry. The driving force based on the determined one or more models may be calculated by the processing circuitry. The driving force of the vehicle to reach a threshold value may be calibrated.

20 Claims, 6 Drawing Sheets

SYSTEM AND METHOD FOR MODULATING A PERFORMANCE OF A VEHICLE WITH MODIFIED VEHICLE COMPONENTS

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

U.S. Pat. No. 8,214,105 B2 to Daly et al. describes a method of providing control signals to an aftermarket component installed in a vehicle. In particular, the method including a steering wheel interface that can detect particular vehicle and aftermarket component configurations and properly transmit steering wheel control signals to the aftermarket component.

SUMMARY

According to an embodiment of the present disclosure, a system and a method for modulating a performance of a vehicle with replaced vehicle parts or vehicle components are provided. The system can include cameras, sensors, interface circuitry, processing circuitry, and memory.

According to an embodiment of the present disclosure, a driving force of a vehicle may be calculated. A status change of one or more components of the vehicle may be detected by a sensor. One or more models of the one or more components of the vehicle having the status change may be determined by processing circuitry. The driving force based on the determined one or more models may be calculated by the processing circuitry. The driving force of the vehicle to reach a threshold value may be calibrated.

In some embodiments, the calculation is not limited to driving force of the vehicle. Other aspects of operating conditions of the vehicle can be calculated to improve or normalize modifications of the vehicle.

In an example, a gear shift schedule may be calculated based on the determined one or more models. The gear shift schedule of the vehicle may be calibrated. The calibration of the gear shift schedule may include at least one of increasing a delay time of the gear shift schedule and decreasing the delay time of the gear shift schedule.

In an example, the threshold value may be associated with an emission level of the vehicle. The status change of the one or more components may include at least one of a removal of one of the one or more components, an addition of one of the one or more components, and a replacement of one of the one or more components.

In an example, the one or more components may include at least one of tires, bumpers, shocks, springs, sway bays, differentials, and wheels of the vehicle.

In an example, the determination of the one or more models of the one or more components may be based on at least one of radio-frequency identification and Bluetooth enabled smart tags.

In an example, the one or more models may include at least one of vehicle models and vehicle manufacturers.

In an example, the calibrated driving force and an original driving force before the status change may be displayed.

In an example, at least one of models before the status change and the one or more models after the status change may be selected by a user of the vehicle.

In an example, the selection to at least one of other vehicles, vehicle manufacturers, and users of vehicle having a same vehicle model may be shared.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
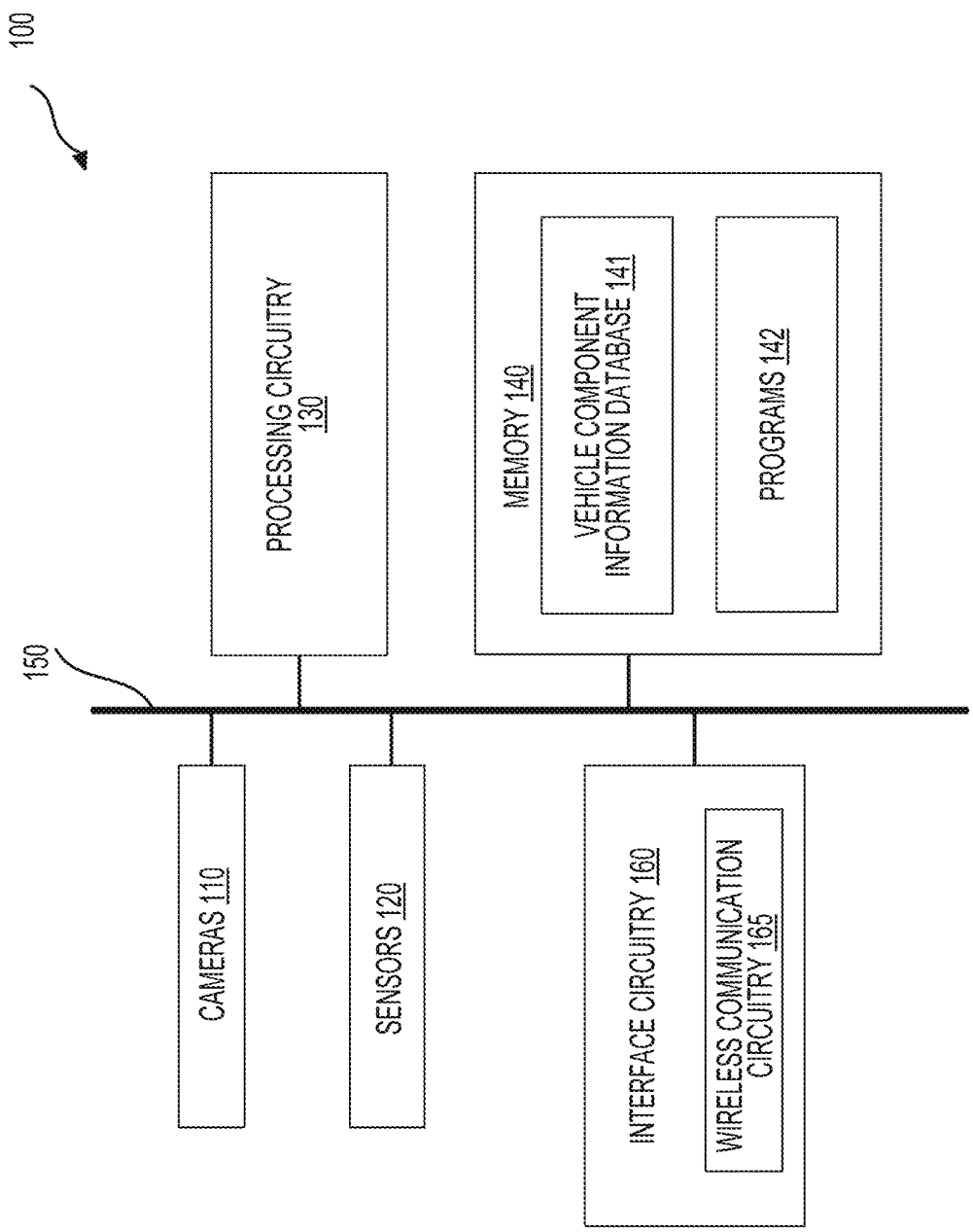
FIG. 1 is a schematic of an exemplary system according to an embodiment of the disclosure.

A system and a method for modulating a performance of a vehicle with replaced vehicle components may be provided. The system may include cameras, sensors, interface circuitry, processing circuitry, and memory.

A driving force of a vehicle may be calculated. A status change of one or more components of the vehicle may be detected by a sensor. One or more models of the one or more components of the vehicle having the status change may be determined by processing circuitry. The driving force based on the determined one or more models may be calculated by the processing circuitry. The driving force of the vehicle to reach a threshold value may be calibrated.

The detection of the status change of the one or more components of the vehicle may be used for the updates to vehicle software hard-coded parameters to recalibrate on-board system. For example, if new wheels are installed in the vehicle, a base vehicle mass value of the vehicle may change. Furthermore, the base vehicle mass value can be recalibrated in the on-board system due to the detection of status change.

The detection of the status change of the one or more components of the vehicle may be used to detect or report the defects of the one or more components or counterfeits of the one or more components.

The detection of the status change of the one or more components of the vehicle may be used to estimate an impact of the changes of the one or more components of the vehicle.

The detection of the status change of the one or more components of the vehicle may be used to communicate with other vehicles for future modifications of the components of the vehicles.

A gear shift schedule may be calculated based on the determined one or more models. The gear shift schedule of the vehicle may be calibrated. The calibration of the gear shift schedule may include at least one of increasing a delay time of the gear shift schedule and decreasing the delay time of the gear shift schedule.

The threshold value may be associated with an emission level of the vehicle. The status change of the one or more components may include at least one of a removal of one of the one or more components, an addition of one of the one or more components, and a replacement of one of the one or more components.

The modulation of the performance of the vehicle may be used to educate the drivers of the vehicles for the impact of the changes of the one or more components of the vehicle.

The one or more components may include at least one of tires, bumpers, shocks, springs, sway bays, differentials, and wheels of the vehicle.

The determination of the one or more models of the one or more components may be based on at least one of radio-frequency identification and Bluetooth enabled smart tags.

The one or more models may include at least one of vehicle models and vehicle manufacturers.

The calibrated driving force and an original driving force before the status change may be displayed.

At least one of models before the status change and the one or more models after the status change may be selected by a user of the vehicle.

The selection to at least one of other vehicles, vehicle manufacturers, and users of vehicle having a same vehicle model may be shared.

Turning now to the figures, an exemplary system 100 is now described with reference to FIG. 1. In addition, FIGS. 2A and 2B show examples of camera modules and sensors in a vehicle according to an embodiment of the disclosure.

The system 100 can include camera modules 110, sensors 120, processing circuitry 130, memory 140, and interface circuitry 160 that are coupled together, for example, using a bus 150. In an example, such as shown in FIG. 1, the system 100 is a part of the first vehicle 101, as shown in FIGS. 2A and 2B. The first vehicle can be any suitable vehicle that can move, such as a car, a cart, a train, or the like. Alternatively, certain components (e.g., the camera modules 110 and the sensors 120) of the system 100 can be located in the first vehicle 101 and certain components (e.g., processing circuitry 130) of the system 100 can be located remotely in a server, a cloud, or the like, that can communicate with the first vehicle 101 wirelessly.

The camera modules 110 and the sensors 120 can be used to detect any components of the vehicle. The components of the vehicle may be, but not limited to, at least one of tires, bumpers, shocks, springs, sway bays, differentials, and wheels of the vehicle.

The camera modules 110 can be any suitable devices that can obtain images or videos. The camera modules 110 can capture different views of the first vehicle 101 or the components in the first vehicle 101. The camera modules 110 can be fixed to the first vehicle 101. The camera modules 110 can be detachable, for example, the camera modules 110 can be attached to, removed from, and then reattached to the first vehicle 101.

The camera modules 110 can be positioned at any suitable locations of any vehicles, e.g., the first vehicle 101 in FIG. 2. The camera modules 110 can be oriented toward any suitable directions. Accordingly, the camera modules 110 can obtain images or videos to show different portions of the surrounding environment of the first vehicle 101 and to take images or videos of the components of the first vehicle 101. For example, the camera modules 110 can detect the one or more models of the components of the vehicle by the RFID on the components, as described earlier.

In some embodiments, the different portions of components of the first vehicle 101 can include a front portion of the first vehicle that includes components in front of the first vehicle 101, a rear portion of the first vehicle that includes components behind the first vehicle 101, a right portion of the first vehicle that includes components to the right of the first vehicle 101, a left portion of the first vehicle that includes components to the left of the first vehicle 101, a bottom portion of the first vehicle that includes components under the first vehicle 101, a top portion of the first vehicle that includes components above the first vehicle 101, and/or the like.

For example, the bottom view can show a tire, or the like. Different portions, such as the left portion and the bottom portion, can overlap. Additional views (e.g., a right-front view, a top-left view) can be obtained by adjusting an orientation of a camera module, by combining multiple camera views, and thus show corresponding portions of the surrounding environment. An orientation of a camera module can be adjusted such that the camera module can show different portions using different orientations.

In general, the camera modules 110 can include taking different views and/or different field of views (FOVs) of the first vehicle 101. In an example, the images can include the front view, the right-front view, the front bird-eye view (e.g., the front view with the bird-eye FOV), the normal left-front view (e.g., the left-front view with the normal FOV), and/or the like.

The sensors 120 can be a RFID sensor, a vehicle speed sensor, a wheel speed sensor, and in some embodiment, the sensors 120 can be a LIDAR, a sonar, a GPS location sensor, a or the combination thereof. For example, the RFID sensor can detect the models or serial number of the components of the first vehicle 101. a vehicle speed sensor can provide a speed data of the first vehicle 101. The GPS location sensor can provide one or more GPS coordinates on a map for the first vehicle 101. Therefore, the data collected by sensors 120 can be the RFID of the components, vehicle speed data, wheel speed data, GPS location data, or the combination thereof. Thus, the information associated with one or more components of the first vehicle 101 can be collected by the camera modules 110 and the sensors 120.

In an embodiment, the data collected by the cameras 110 and sensors 120 includes information of the one or more components of the first vehicle 101. The vehicle component information data can include models, size, and length of the one or more components of the first vehicle 101. The vehicle component information data can be stored in vehicle component information database 141 in the memory 140. The program 142 in the memory 140 can analyze the database from the vehicle component information data collected by cameras 110 and sensors 120.

FIGS. 2A-2B show examples of the camera modules 110, e.g., the camera modules 110(1)-(10), or sensors 120, e.g., the sensors 120(1)-(10), according to an embodiment of the disclosure. For example, the camera module 110(1) is positioned on a top side of the first vehicle 101. The camera modules 110(2)-(3) are positioned on a left side of the first vehicle 101 where the camera module 110(2) is near a front end of the first vehicle 101 and the camera module 110(3) is near a rear end of the first vehicle 101. The camera module 110(4) is positioned on the front end of the first vehicle 101 where the camera module 110(5) is positioned at the rear end of the first vehicle 101. The camera modules 110(6)-(8) are positioned on a bottom side of the first vehicle 101. The camera modules 110(9)-(10) are positioned on the left side and a right side of the first vehicle 101, respectively.

In an example, the sensor 120(1) is positioned on a top side of the first vehicle 101. The sensors 120(2)-(3) are positioned on a left side of the first vehicle 101 where the sensor 120(2) is near a front end of the first vehicle 101 and the sensor 120(3) is near a rear end of the first vehicle 101. The sensor 120(4) is positioned on the front end of the first vehicle 101 where the sensor 120(5) is positioned at the rear end of the first vehicle 101. The sensors 120(6)-(8) are positioned on a bottom side of the first vehicle 101. The sensors 120(9)-(10) are positioned on the left side and a right side of the first vehicle 101, respectively.

In an example, the camera modules 110 and the sensors 120 can be positioned together. The camera module 110(1) and the sensor 120(1) are positioned on a top side of the first vehicle 101. The camera modules 110(2)-(3) and the sensors 120(2)-(3) are positioned on a left side of the first vehicle 101 where the camera module 110(2) and the sensor 120(2) are near a front end of the first vehicle 101 and the camera module 110(3) and the sensor 110(3) are near a rear end of the first vehicle 101. The camera modules 110(4) and the sensor 110(4) are positioned on the front end of the first vehicle 101 where the camera modules 120(5) and the sensor 110(5) are positioned at the rear end of the first vehicle 101. The camera modules 110(6)-(8) and the sensors 110(6)-(8) are positioned on a bottom side of the first vehicle 101. The camera modules 110(9)-(10) and the sensors 110(9)-(10) are positioned on the left side and a right side of the first vehicle 101, respectively.

In an example, the camera module 110(4) is oriented such that the camera module 110(4) can obtain images or videos of the front portion of the first vehicle. For example, the camera modules at the front portion of the vehicle may capture components at the front portion of the vehicle.

The descriptions related to the camera module 110(4) and sensor 120(4) can be suitably adapted to other camera modules or sensors. For example, the camera module 110(10) is oriented such that the camera module 110(10) can obtain images or videos of the left portion of the components of the first vehicle.

The interface circuitry 160 can be configured to communicate with any suitable device of the first vehicle 101 using any suitable devices and/or communication technologies, such as wired, wireless, fiber optic communication technologies, and any suitable combination thereof. The interface circuitry 160 can include wireless communication circuitry 165 that is configured to receive and transmit data wirelessly from servers (e.g., a dedicated server, a cloud including multiple servers), vehicles (e.g., using vehicle-to-vehicle (V2V) communication), infrastructures (e.g., using vehicle-to-infrastructure (V2I) communication), one or more third-parties (e.g., a municipality), map data services (e.g., Google Maps, Waze, Apple Maps), and/or the like.

In an example, the wireless communication circuitry 165 can communicate with mobile devices including a mobile phone via any suitable wireless technologies such as IEEE 802.15.1 or Bluetooth. In an example, the wireless communication circuitry 165 can use wireless technologies, such as IEEE 802.15.1 or Bluetooth, IEEE 802.11 or Wi-Fi, mobile network technologies including such as global system for mobile communication (GSM), universal mobile telecommunications system (UMTS), long-term evolution (LTE), fifth generation mobile network technology (5G) including ultra-reliable and low latency communication (URLLC), and the like.

The interface circuitry 160 can include any suitable individual device or any suitable integration of multiple devices such as touch screens, keyboards, keypads, a mouse, joysticks, microphones, universal series bus (USB) interfaces, optical disk drives, display devices, audio devices (e.g., speakers), and the like. The interface circuitry may include a display device. The display device can be configured to display images/videos captured by one of the camera modules 110.

The interface circuitry 160 can also include a controller that converts data into electrical signals and sends the electrical signals to the processing circuitry 130. The interface circuitry 160 can also include a controller that converts electrical signals from the processing circuitry 130 to the data, such as visual signals including text messages used by a display device, audio signals used by a speaker, and the like.

Figure 2A:
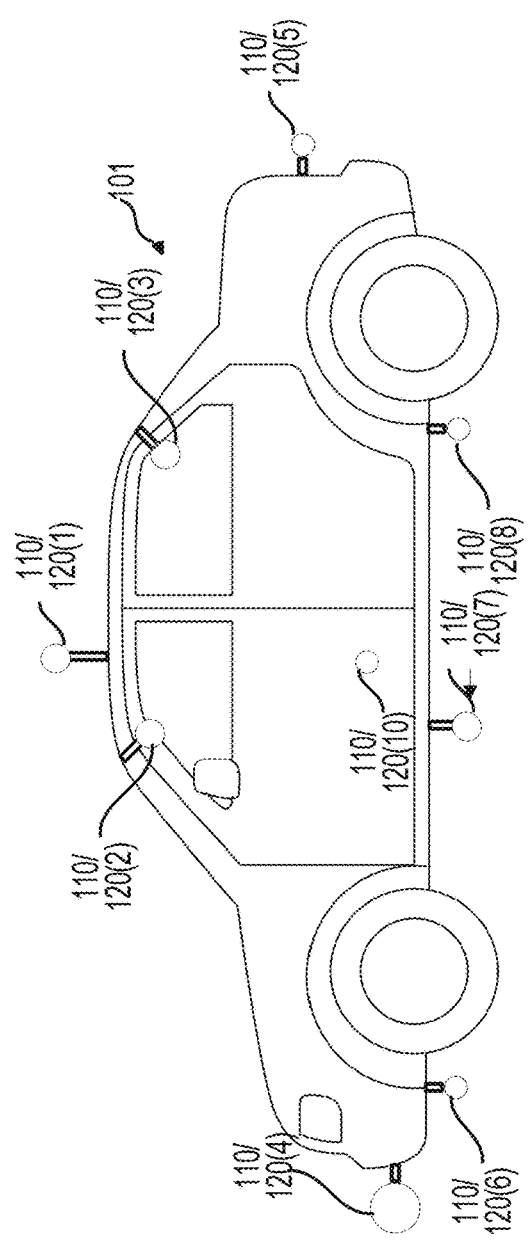
FIGS. 2A-2B show examples of camera modules and sensors in a vehicle according to an embodiment of the disclosure.
Figure 2B:
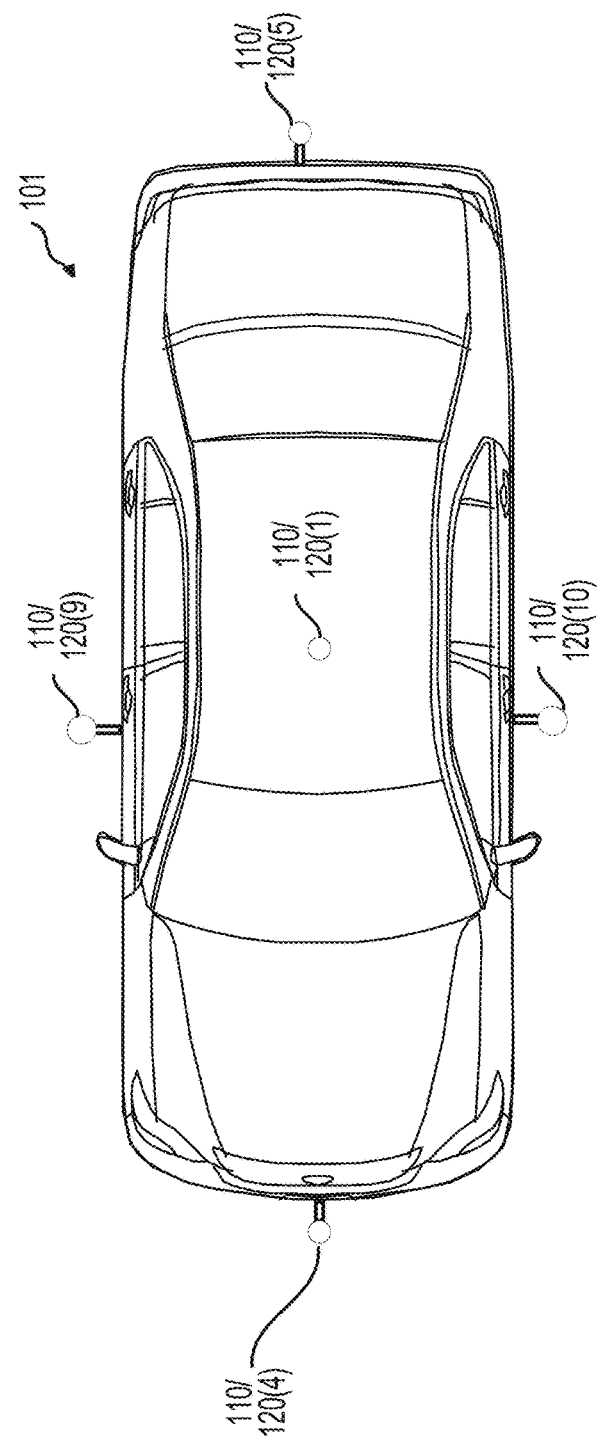

In an example shown in FIG. 1, the processing circuitry 130 is part of the first vehicle 101. In an example, the processing circuitry 130 can be implemented in a server, a cloud, or the like, that is remote from the first vehicle 101. The server, the cloud, or the like can communicate wirelessly with the first vehicle 101 regarding the reconstruction, the visible light signal data, or the like.

The memory 140 is configured to store vehicle components information data in the vehicle components information database 141. The memory 140 is also configured to include programs 142. In an embodiment, information in the memory 140 can be modified or updated by the processing circuitry 130. The modified information can also be uploaded to a cloud services platform that can provide on-demand delivery of computing power, database storage, and IT resources or shared with other vehicles, for example, using the wireless communication circuitry 165 via V2I and V2V communications, respectively.

The memory 140 can be a non-volatile storage medium. In another embodiment, the memory 140 includes both non-volatile and volatile storage media. In one embodiment, a portion of the memory 140 can be integrated into the processing circuitry 130. The memory 140 can be located remotely and communicate with the processing circuitry 130 via a wireless communication standard using the wireless communication circuitry 165.

In an embodiment, in the FIG. 1, for example, the components are coupled together by a bus architecture including a bus 150. Other suitable interconnection techniques can also be used.

One or more components of the interface circuitry 160, the processing circuitry 130, and the memory 140 can be made by discrete devices or integrated devices. The circuits for one or more of the interface circuitry 160, the processing circuitry 130, and the memory 140 can be made by discrete circuits, one or more integrated circuits, application-specific integrated circuits (ASICs), and the like. The processing circuitry 130 can also include one or more central processing units (CPUs), one or more graphic processing units (GPUs), dedicated hardware or processors to implement neural networks, and the like.

Figure 3:
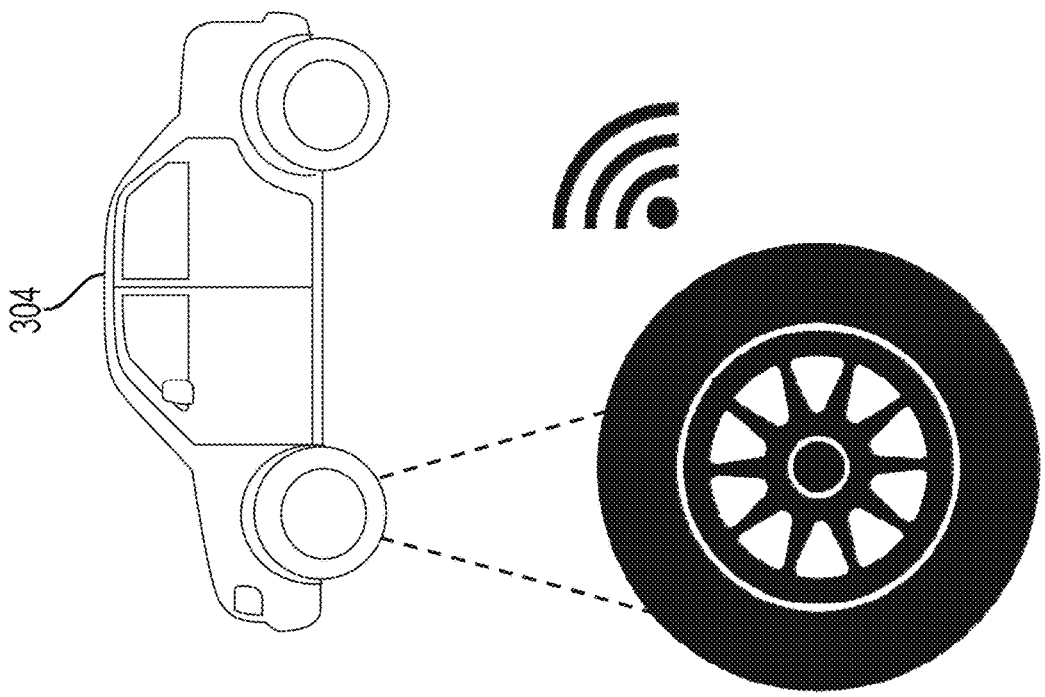
FIG. 3 is modifications of one or more components of the vehicle according to an embodiment of the disclosure.
Figure 3:
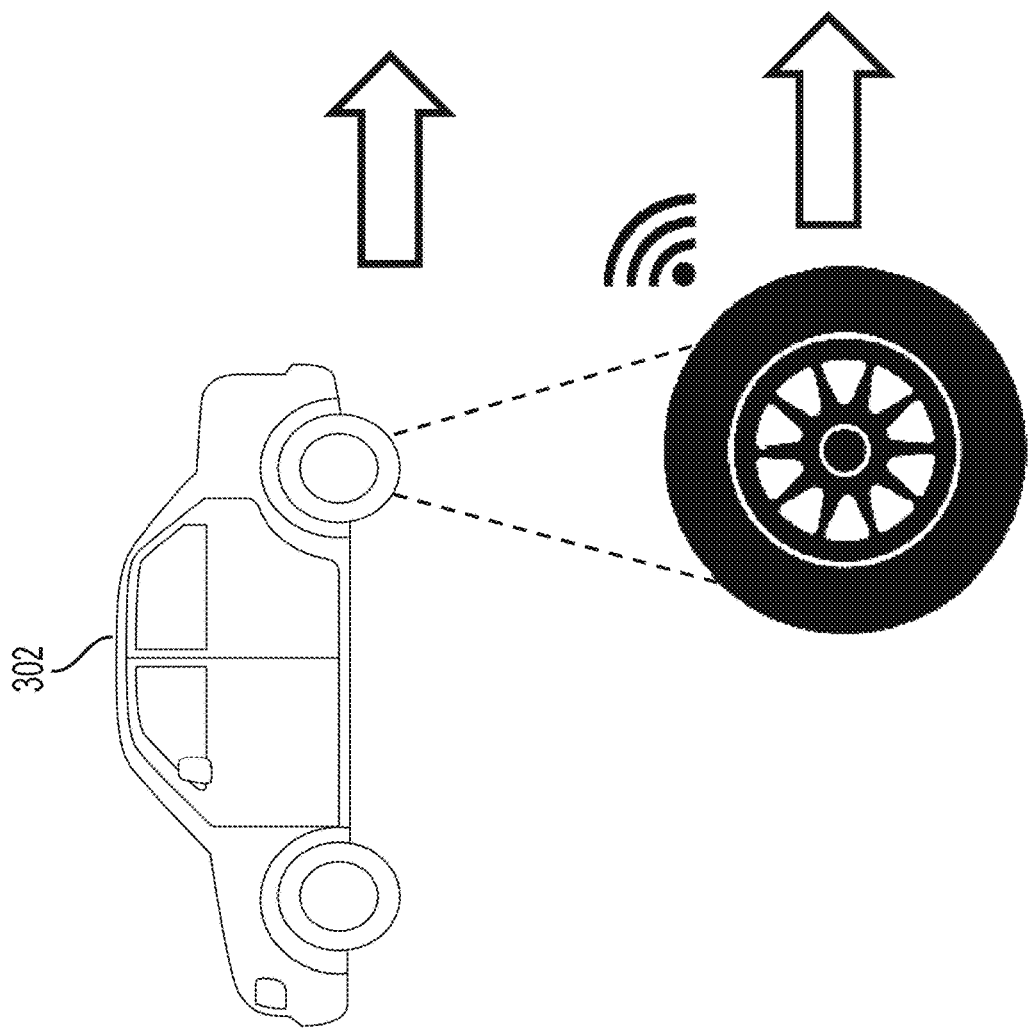

According to an embodiment, and with reference to FIG. 3, modifications of one or more components of the vehicle are presented.

In an embodiment, the camera modules 110 and the sensors 120 in the vehicle 101 can capture the modifications of the one or more components of the vehicle.

In an embodiment, the processing circuitry of the vehicle 101 analyzes the status change of the one or more components of the vehicle to extract information, but not limited to, such as radio-frequency identification (RFID), and Bluetooth enabled smart tags, etc.

The processing circuitry of the vehicle 101 can determine one or more models of the one or more components of the vehicle having the status change. The one or more components include, but not limited to, at least one of tires, bumpers, shocks, springs, sway bays, differentials, and wheels of the vehicle.

In an embodiment, the one or more models of the one or more components are based on at least one of radio-frequency identification and Bluetooth enabled smart tags. The one or more models include at least one of vehicle models and vehicle manufacturers.

In an embodiment, an original vehicle with an original set of tires is shown in 302. The original set of tires may be tires from the vehicle manufacturers. In another example, the vehicle with a same vehicle manufacturer, a same vehicle model, but with a modified set of tires is shown in 304.

The modified set of tires may have communication capabilities to share information to the vehicle and the driver of the vehicle may receive the information from the vehicle. The information of the tires may also be shared or displayed on a screen or a touchscreen of the vehicle.

The information of the tires may include hardware parameters such as, but not limited to, maximum speed limit, maximum engine torque, tire radius, differential gear ratio, maximum shock absorber stroke, etc.

A user of the vehicle may communicate with the vehicle by the display screen or the touch screen of the vehicle. The user may also select a model to enter in the touchscreen from an online database.

In an embodiment, an electronics control unit (ECU) may collect or download the shared information of the tires based on unique identifying information from the set of tires. After receiving the information of the set of tires, the vehicle may rewrite the software to recalibrate the vehicle for the newly installed set of tires.

Figure 4:
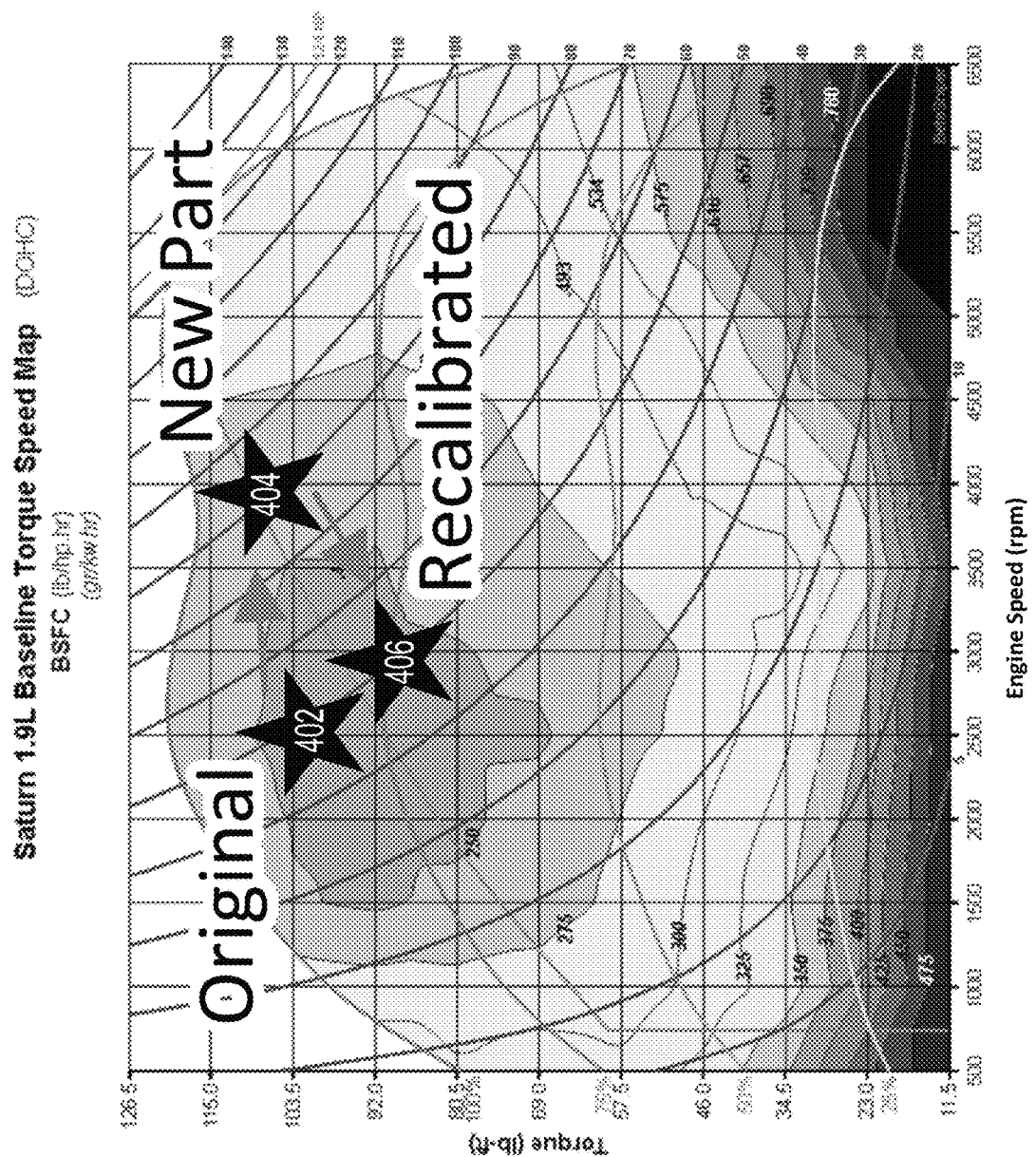
FIG. 4 is a calibration of vehicle software between an original component and a modified component of a vehicle according to an embodiment of the disclosure.

According to an embodiment, and with reference to FIG. 4, a calibration of vehicle software between an original component and a modified component of a vehicle is presented. In FIG. 4, the x-axis represents the engine speed, the y-axis represents engine torque, and the z axis represents how much fuel is consumed per unit time. The value of the shaded region is a brake specific fuel consumption (BSFC) value.

The processing circuitry of the vehicle 101 determines the models of the components of the vehicle having the status change, and then the processing circuitry 101 calibrates the baseline torque speed map for the modified components of the vehicle.

In an example, the original component of the vehicle in the baseline torque speed map is located at 402, which has a brake specific fuel consumption (BSFC) value of 250 lb/hp-hr and an engine speed is 2500 rpm. After modifying or replacing the component with a new part, e.g., a new component of the vehicle, the new component of the vehicle in the baseline torque speed map is located at 404, which has a BSFC value of around 275.

After the software calibration for the new part, e.g., the new component of the vehicle, the recalibrated component of the vehicle in the baseline torque speed map is located at 406, which has a BSFC value of 250. Thus, the recalibrated component in the baseline torque speed map 406 is closer to the original component in the baseline torque speed map 402 than the new component of the vehicle in the baseline torque speed map 404, which means a recalibrated driving force of the new part is closer to the original driving force of the original component of the vehicle than the driving force of the new part without the calibration by the software.

Figure 5:
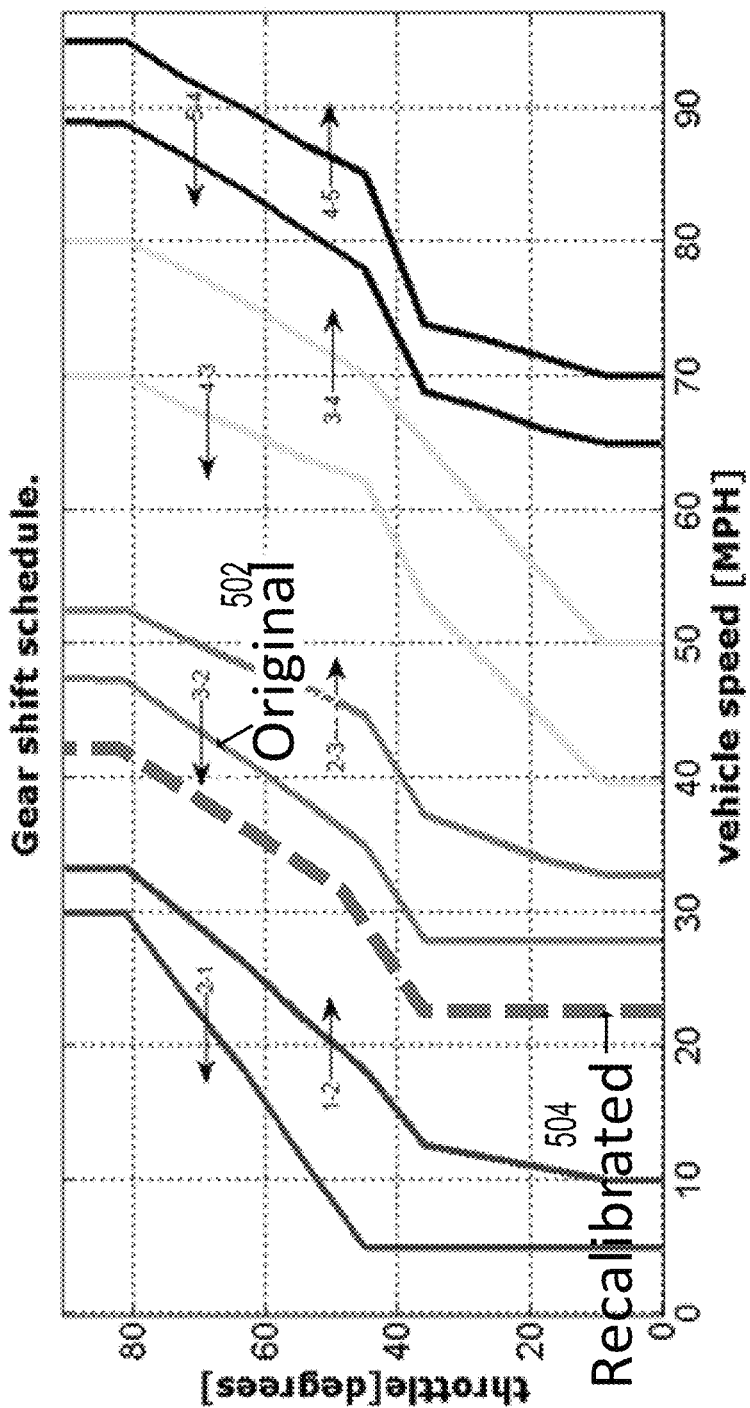
FIG. 5 is a calibration of the gear shift schedule of the new component of the vehicle according to an embodiment of the disclosure.

According to an embodiment, and with reference to FIG. 5, a calibration of the gear shift schedule of the new component of the vehicle is presented.

In an example, the original component of the vehicle in the gear shift schedule map is located at 502, and a recalibrated gear shift schedule for the modified or replaced component of the vehicle is located at 504, which shows the gear shift schedule shifts from 502 to 504 after the recalibration of the modified or replaced component of the vehicle.

As described above in FIG. 4, the processing circuitry determines the models of the components of the vehicle having the status change, and then the processing circuitry 101 calibrates the gear shift schedule based on the detected models of the components of the vehicle.

In an example, the software of the vehicle receives the information such as models of the components of the vehicle and adjust gear shift schedule to delay the up-shifts, e.g., a transition from a first gear to a second gear. The adjustment of the gear shift schedule allows more torque in each gear of the vehicle for a better off-road ability. The adjustment provides a better vehicle operation performance such as a better fuel economy or a lower emission level.

In an example, if the engine speed is allowed to increase in a given gear, the corresponding torque can be increased accordingly, which provides a better controllability due to a lack of need to shift gears. More torque per gear can provide a user of the vehicle to have a better navigation of the off-road terrain by minimizing input changes.

In an example, the software of the vehicle receives the information of the components of the vehicle and adjusts the driving force as shown in FIG. 4 and the gear shift schedule in FIG. 5, so that the engine speed is reduced to maintain emission levels for a given driving speed. Gear ratio fixes how much torque is created at each engine speed, so if the emission at a certain engine speed becomes higher due to the implied change, the gear shift schedule could be modified to avoid the higher emission area. The gear can be shifted earlier or later depending on where the worse emission area result is. The gear ratio is a ratio of an output speed to an input speed.

The estimation of an impact of the modifications of the components of the vehicle may be based on the calculations of the driving force and the gear shift schedule. The impact of the modifications of the components of the vehicle may be presented or displayed to the driver of the vehicle. For example, a vehicle with an original tire and an original lift kit may have an average fuel economy of 21 mpg, and the vehicle with a modified tire and a modified lift kit may have an average fuel economy of 12 mpg. Thus, the modified tire and the modified lift kit reduced the fuel economy by 45 percent since the fuel economy drops from 21 mpg to 12 mpg.

The processing circuitry may determine whether the component or the part of the vehicle is a counterfeit or a defective component based on the mismatch of the vehicle performance of the component or the part of the vehicle. For example, based on the collected information of the fuel economy of the component such as tire, if the tire is expected to be 35 mph at a $2^{nd}$ gear and 2000 engine rpm, but the tire is only running at 30 mph now, the processing circuitry may determine that the tire is a counterfeit or a defective tire.

In some embodiments, one of common engine modifications is to replace restrictive exhaust manifolds with higher-flowing exhaust headers. The restrictive exhaust manifolds collect exhaust gases from each combustion chamber and direct through the catalytic converters and mufflers. The exhaust gases can exit the combustion chamber faster, which in turn allows the engine to rotate to a higher engine speed (rpm) before it chokes. The exhaust fumes cannot exit quick enough before the next revolution begins. In this instance, the maximum engine speed which is set in the calibration can be increased to make a better use of the engine modifications.

The processing circuitry may provide additional recommendations with estimations of the impact of the modifications of the components of the vehicle of the future vehicle performance gain based on the desired character of the vehicle or a target of the vehicle performance, or to maintain a street legal vehicle performance. The street legal may be defined based on regions and may be suggested based on global positioning system (GPS) information or tied electronically to the vehicle identification number (VIN) and current registration information. For example, a user of the vehicle wishes to achieve a certain 0-60 time, the system can inform the user of the estimated impact of their modification towards achieving the goal. In another example, the user may want to reach 12" of ground clearance. The user may install new shocks and the system could inform them of the newest ground clearance value from estimation or a database.

In an example, the processing circuitry may recommend a new camshaft profile to better match the lower torque requirements of an off-road driving as determined by the current combination of the modified tires and the modified lift kit. The shape of the camshaft lobe can be used to determine how long or duration of the valves in a combustion cylinder are open. The height of the peak of the camshaft lobe determines how far open the valve goes. The ramp angle of the camshaft lobe can be used to determine how quickly air and fuel mixture enters or exits the cylinder. All of these factors can be used to determine how much power and torque an engine makes at a given engine speed. Camshafts can be designed and marketed by operating speed ranges, peak power, and torque values.

In an example, the processing circuitry may prompt the customer to enter the modified wheel and the tire size, so the speedometer can be updated. As another example, the processing circuitry may allow the customer to select new products from an online database when the customer enters the modified wheel and the tire size.

In some embodiments, drive and non-drive wheels have different wheel sizes. This is done to provide more grip to the wheels. Before tires slip and traction is lost, more surface area of the wheels can accept more torque and power. In this case, the vehicle can modify distribution of torque between wheels in accordance with a wheel and a tire size difference. For example, a stock or an original calibration set the torque distribution of the front wheel and the rear wheel as 50/50. If an all-wheel drive (AWD) vehicle owner puts one inch wider tires on the rear of their vehicle, the new wider rear tires that the vehicle can implement is a distribution of 40/60 between the front and the rear tires to have a better use of the wheel/tire modification.

In an embodiment, the history of the modifications of vehicle parts or components may be stored in the memory of the vehicle or in the remote server. The customer may access the history of the modifications.

In an embodiment, the platform of the vehicle to vehicle communication and vehicle to infrastructure communication may be used to share the modification history of the components of the vehicle with, but not limited to, the vehicle part installers, used tire stores, social platform, etc.

Figure 6:
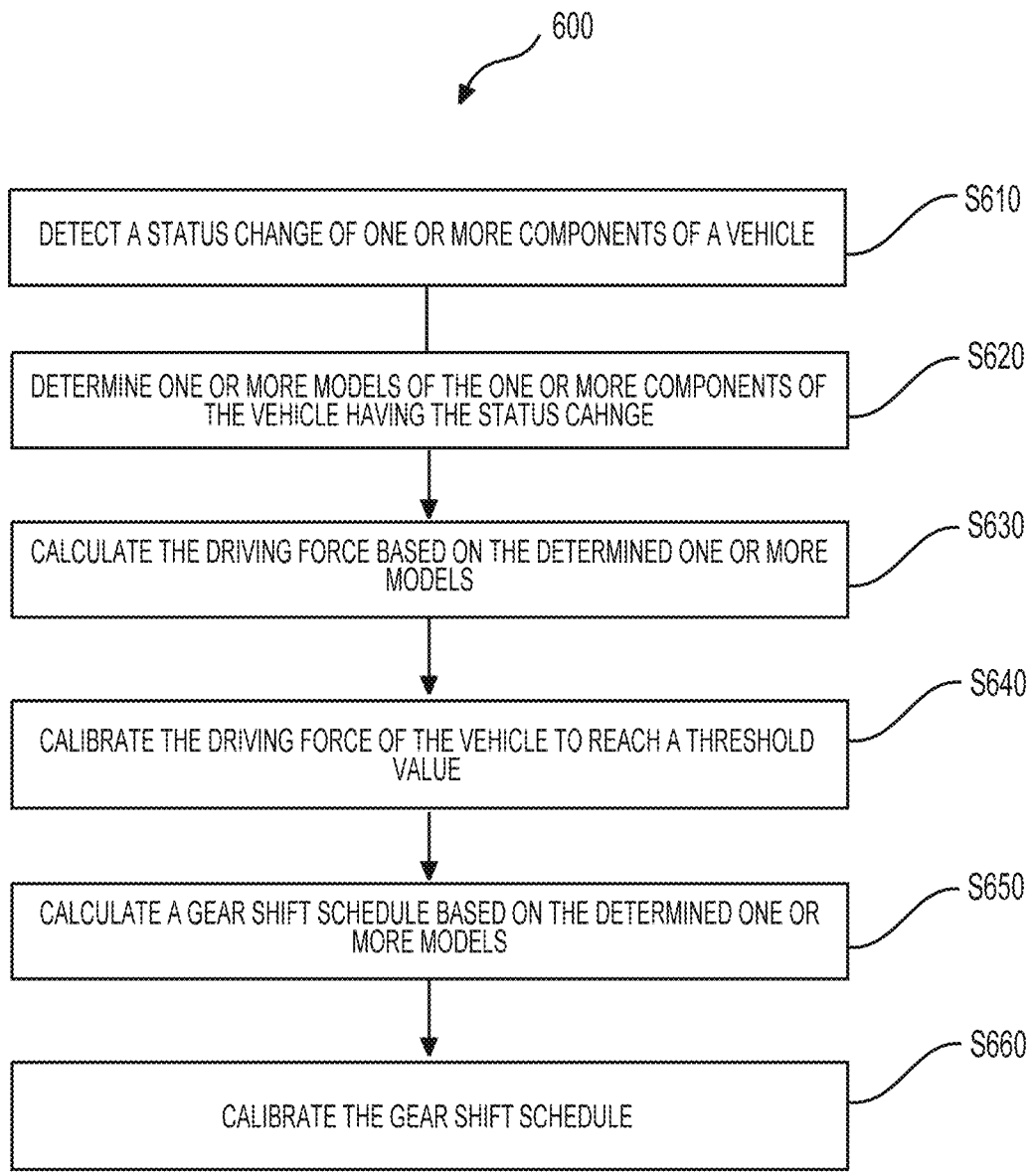
FIG. 6 is a flowchart outlining an exemplary process according to an embodiment of the disclosure.

According to an embodiment, and with reference to FIG. 6, a flowchart outlining an exemplary process 600 is presented.

In an embodiment, the process 600 can be implemented using the system 100 described in FIG. 1. In an embodiment, the process 600 can be used to calibrate driving force and gear shift schedule of a vehicle. For purposes of brevity, descriptions are given for the first vehicle 101, and the descriptions can be suitably adapted to any suitable vehicle. As described above, the first vehicle 101 can include the camera modules 110 and the sensors 120 configured to detect the status change of components of a vehicle.

At S610, the sensor detects a status change of one or more components of a vehicle. The status change of the one or more components includes at least one of a removal of one of the one or more components, an addition of one of the one or more components, and a replacement of one of the one or more components. The one or more components include at least one of tires, bumpers, shocks, springs, sway bays, differentials, and wheels of the vehicle.

At S620, the processing circuitry determines one or more models of the one or more components of the vehicle having the status change. The determination of the one or more models of the one or more components is based on at least one of radio-frequency identification and Bluetooth enabled smart tags. The one or more models include at least one of vehicle models and vehicle manufacturers.

At S630, the processing circuitry calculates the driving force based on the determined one or more models.

At S640, the processing circuitry calibrates the driving force of the vehicle to reach a threshold value. The threshold value is associated with an emission level of the vehicle.

At S650, the processing circuitry calculates a gear shift schedule based on the determined one or more models.

At S660, the processing circuitry calibrates the gear shift schedule. The calibration of the gear shift schedule includes at least one of increasing a delay time of the shift schedule and decreasing the delay time of the shift schedule.

Different vehicles and different components can have different vehicle component information in the respective vehicles or components.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of calibrating a driving force of a vehicle, comprising:
   detecting, by a sensor, a status change of one or more components of the vehicle;
   determining, by processing circuitry, one or more models of the one or more components of the vehicle having the status change;
   calculating, by the processing circuitry, the driving force based on the determined one or more models; and
   calibrating the driving force of the vehicle to reach a threshold value.

2. The method of claim 1, further comprising:
   calculating a gear shift schedule based on the determined one or more models; and
   calibrating the gear shift schedule of the vehicle.

3. The method of claim 2, wherein the calibration of the gear shift schedule includes at least one of increasing a delay time of the shift schedule and decreasing the delay time of the shift schedule.

4. The method of claim 1, wherein the threshold value is associated with an emission level of the vehicle.

5. The method of claim 1, wherein the status change of the one or more components includes at least one of a removal of one of the one or more components, an addition of one of the one or more components, and a replacement of one of the one or more components.

6. The method of claim 1, wherein the one or more components include at least one of tires, bumpers, shocks, springs, sway bays, differentials, and wheels of the vehicle.

7. The method of claim 1, wherein the determination of the one or more models of the one or more components is based on at least one of radio-frequency identification and Bluetooth enabled smart tags.

8. The method of claim 1, wherein the one or more models include at least one of vehicle models and vehicle manufacturers.

9. The method of claim 1, further comprising:
displaying the calibrated driving force and an original driving force before the status change; and
selecting, by a user of the vehicle, at least one of models before the status change and the one or more models after the status change.

10. The method of claim 9, further comprising sharing the selection to at least one of other vehicles, vehicle manufacturers, and users of vehicles having a same vehicle model.

11. A system for calibrating a driving force of a vehicle, comprising processing circuitry configured to:
detect, by a sensor, a status change of one or more components of the vehicle;
determine, by the processing circuitry, one or more models of the one or more components of the vehicle having the status change;
calculate, by the processing circuitry, the driving force based on the determined one or more models; and
calibrate the driving force of the vehicle to reach a threshold value.

12. The system of claim 11, wherein the processing circuitry is configured to:
calculate a gear shift schedule based on the determined one or more models; and
calibrate the gear shift schedule of the vehicle.

13. The system of claim 12, wherein the calibration of the gear shift schedule includes at least one of increasing a delay time of the shift schedule and decreasing the delay time of the shift schedule.

14. The system of claim 11, wherein the threshold value is associated with an emission level of the vehicle.

15. The system of claim 11, wherein the status change of the one or more components includes at least one of a removal of one of the one or more components, an addition of one of the one or more components, and a replacement of one of the one or more components.

16. The system of claim 11, wherein the one or more components include at least one of tires, bumpers, shocks, springs, sway bays, differentials, and wheels of the vehicle.

17. The system of claim 11, wherein the determination of the one or more models of the one or more components is based on at least one of radio-frequency identification and Bluetooth enabled smart tags.

18. The system of claim 11, wherein the one or more models include at least one of vehicle models and vehicle manufacturers.

19. The system of claim 11, wherein the processing circuitry is configured to:
display the calibrated driving force and an original driving force before the status change; and
select, by a user of the vehicle, at least one of models before the status change and the one or more models after the status change.

20. A non-transitory computer readable storage medium having instructions stored thereon that when executed by processing circuitry causes the processing circuitry to perform a method, the method comprising:
detecting, by a sensor, identifications of one or more components of a vehicle;
determining, by processing circuitry, one or more models of the one or more components based on the identifications;
calculating, by the processing circuitry, vehicle performance based on the one or more models;
modulating, by an electronic control unit, the vehicle performance based on the calculation; and
adjusting one or more parameters of the vehicle based on the modulation.

* * * * *